(12) United States Patent
Nosakowski et al.

(10) Patent No.: US 11,927,222 B2
(45) Date of Patent: *Mar. 12, 2024

(54) VEHICLE DRIVETRAIN ASSEMBLY AND METHOD FOR MAKING THE ASSEMBLY

(71) Applicant: TransForm Automotive LLC, Sterling Heights, MI (US)

(72) Inventors: Brian M. Nosakowski, Macomb Township, MI (US); Johnny B. Heang, Troy, MI (US)

(73) Assignee: TransForm Automotive LLC, Sterling Heights, MI (US)

( * ) Notice: Subject to any disclaimer, the term of this patent is extended or adjusted under 35 U.S.C. 154(b) by 95 days.

This patent is subject to a terminal disclaimer.

(21) Appl. No.: 17/693,880

(22) Filed: Mar. 14, 2022

(65) Prior Publication Data

US 2022/0221006 A1 Jul. 14, 2022

Related U.S. Application Data

(63) Continuation of application No. 16/595,624, filed on Oct. 8, 2019, now Pat. No. 11,306,784.

(60) Provisional application No. 62/744,328, filed on Oct. 11, 2018.

(51) Int. Cl.
| | |
|---|---|
| *F16D 1/068* | (2006.01) |
| *B23K 13/01* | (2006.01) |
| *F16B 5/08* | (2006.01) |
| *F16H 48/38* | (2012.01) |

(52) U.S. Cl.
CPC ............ *F16D 1/068* (2013.01); *B23K 13/015* (2013.01); *F16B 5/08* (2013.01); *F16H 2048/385* (2013.01)

(58) Field of Classification Search
CPC . F16D 1/068; F16B 5/08; F16H 55/12; F16H 48/40; F16H 2048/385; B23K 13/015; B23K 20/06
See application file for complete search history.

(56) References Cited

U.S. PATENT DOCUMENTS

| | | |
|---|---|---|
| 5,271,287 A | 12/1993 | Wadleigh |
| 6,125,980 A | 10/2000 | Ruth et al. |
| 6,968,718 B2 | 11/2005 | Imamura |
| 7,364,062 B2 | 4/2008 | Moore |
| 9,050,643 B2 | 6/2015 | Wolsiefer et al. |
| 9,120,184 B2 | 9/2015 | Uchia |
| 9,239,104 B2 | 1/2016 | Uchida |
| 10,060,482 B2 | 8/2018 | Dietrich |
| 10,781,908 B2 | 9/2020 | Horak |
| 11,306,784 B2 * | 4/2022 | Nosakowski ........... F16D 1/068 |
| 2007/0029326 A1 | 2/2007 | Gafri et al. |

(Continued)

OTHER PUBLICATIONS

Chinese Office Action, with English language summary, corresponding to Chinese Application No. 2019800666615, dated Nov. 16, 2022, 17 pages.

(Continued)

*Primary Examiner* — Michael P Ferguson
(74) *Attorney, Agent, or Firm* — Reising Ethington P.C.

(57) ABSTRACT

A vehicle drivetrain assembly, and method for making the assembly, including first and second torque transmitting members, one of which is made of aluminum and the other of which is made of steel, and being joined by an electromagnetic pulse weld progressively applied along a radial direction relative to a central axis of the assembly.

8 Claims, 4 Drawing Sheets

(56) References Cited

U.S. PATENT DOCUMENTS

| | | |
|---|---|---|
| 2009/0266198 A1 | 10/2009 | Nosakowski |
| 2012/0088628 A1 | 4/2012 | Ziemer et al. |
| 2014/0045638 A1 | 2/2014 | Roscoe |
| 2015/0258642 A1 | 9/2015 | Killian |
| 2018/0306300 A1 | 10/2018 | Rothstein |

OTHER PUBLICATIONS

R.M. Miranda et al., "Magnetic pulse welding on the cutting edge of industrial applications", Aug. 31, 2013, vol. 19, No. 01, pp. 69-81.

Chinese Office Action corresponding to Chinese Application No. 2019800666615, dated May 26, 2022, 10 pages.

\* cited by examiner

US 11,927,222 B2

VEHICLE DRIVETRAIN ASSEMBLY AND METHOD FOR MAKING THE ASSEMBLY

TECHNICAL FIELD

This invention relates to a vehicle drivetrain assembly for use in transmitting torque between a vehicle engine and driving wheels, and the invention also relates to a method for making the vehicle drivetrain assembly.

BACKGROUND

Drivetrain assemblies for vehicles are used to transmit torque between a power plant and driving wheels of a vehicle upon rotation about a central axis during the vehicle driving.

SUMMARY

A vehicle drivetrain assembly comprises first and second torque transmitting members. The first torque transmitting member is made of aluminum and includes an annular planar plate portion having a round opening through which a central axis of the assembly extends. The first torque transmitting member is a clutch hub or housing and includes an annular wall circumferentially-extending around the planar plate portion and having an axially extending spline portion. The second torque transmitting member is made of steel and includes an annular connection location that faces axially relative to the central axis and extends around the round opening of the planar plate portion of the first torque transmitting member. The second torque transmitting member is a sun gear, a ring gear, a torque transmitting hub, or a shaft. An electromagnetic pulse weld forms and connects the plate portion of the first torque transmitting member around its round opening with the connection location of the second torque transmitting member. The electromagnetic pulse weld is progressively applied along a radial direction relative to the central axis of the assembly.

A method for making a vehicle drivetrain assembly comprises positioning an annular planar plate portion of an aluminum torque transmitting member having a round opening with a central axis in a spaced relationship adjacent an annular connection location of a steel torque transmitting member with the annular connection location facing axially relative to the central axis and extending around the opening of the aluminum torque transmitting member. The aluminum torque transmitting member is a clutch hub or housing including an annular wall circumferentially extending around the planar plate portion and having an axially extending spline portion, and the steel torque transmitting member is a sun gear, a ring gear, a torque transmitting hub, or a shaft. The method also comprises progressively applying an electromagnetic pulse weld along a radial direction relative to the central axis of the assembly to form and weld the plate portion of the aluminum torque transmitting member to the connection location of the steel torque transmitting member.

BRIEF DESCRIPTION OF THE DRAWINGS

FIG. 4 is a view of the alternate embodiment of the vehicle drivetrain assembly shown in FIG. 3 and is similar to FIG. 2 before the forming and electromagnetic pulse welding shown in FIGS. 3 and 3a.

DETAILED DESCRIPTION OF THE PREFERRED EMBODIMENTS

Figure 1A:
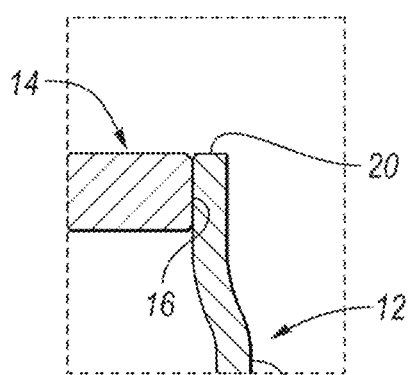
FIG. 1a is an enlarged view of a portion of FIG. 1 illustrating a portion of the vehicle drivetrain assembly where the aluminum member is formed and electromagnetically pulse welded to the steel member.
Figure 1:
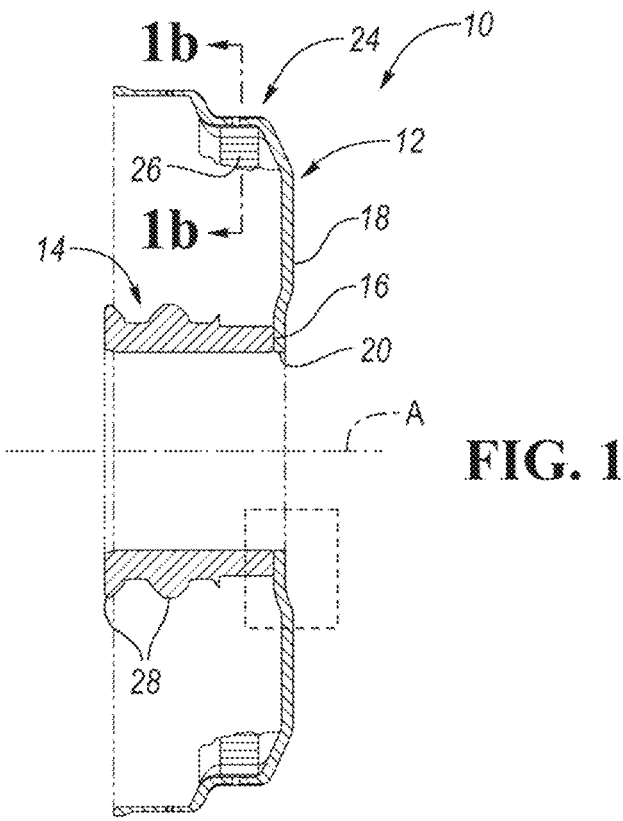
FIG. 1 is a sectional view without most of its background for illustrating a vehicle drivetrain assembly having connected aluminum and steel members that are electromagnetically pulse welded to each other.

With reference to FIG. 1, a vehicle drivetrain assembly generally indicated by 10 is constructed in accordance with the invention by the method of the invention and includes a first torque transmitting member 12 made of aluminum, a second torque transmitting member 14 made of steel and an electromagnetic pulse weld 16 that connects the members to each other as is hereinafter more fully described. Both the construction of the vehicle drivetrain assembly 10 and the method of making the assembly will be described in an integrated manner to facilitate an understanding of different aspects of the invention.

Figure 1B:
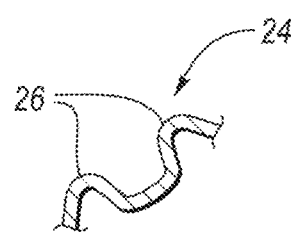
FIG. 1b is a partial sectional view taken along the direction of line 1b-1b of FIG. 1 to illustrate a thin-walled spline portion of the aluminum member.
Figure 2A:
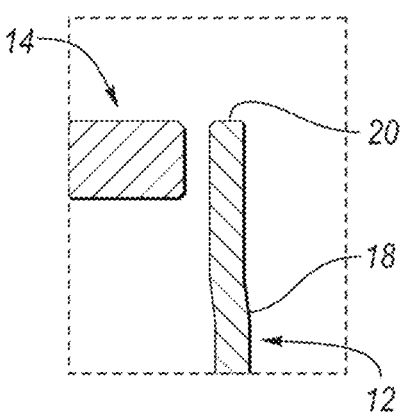
FIG. 2a is an enlarged view of a portion of FIG. 2 similar to FIG. 1a but before the forming and electromagnetic pulse welding.

With continuing reference to FIG. 1, the aluminum member 12 includes a planar plate portion 18 of a round shape having a central round opening 20 through which a rotational central axis A of the assembly extends. The second steel member 14 includes an annular connection location 22 that faces axially relative to the central axis A as best shown in FIG. 2*b* and that extends around the round opening 20 of the planar plate portion 18 of the aluminum member 12. The electromagnetic pulse weld 16 as shown in FIG. 1*b* forms and connects the plate portion 18 of the first aluminum member 12 around its round opening 20 with the connection location 22 of the second steel member 14. Thus, the second steel member 14 has durability for use as required while the first aluminum member 12 advantageously provides the vehicle drivetrain assembly with a lighter construction than would be the case with making it of steel.

Figure 2:
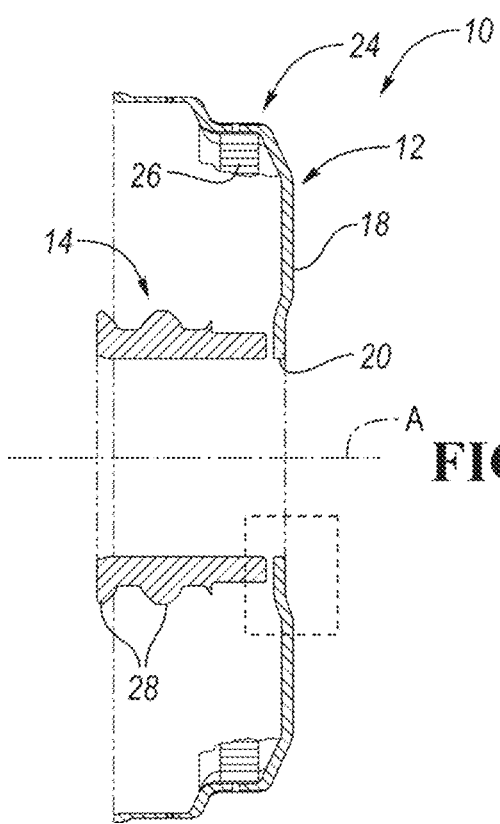
FIG. 2 is a sectional view of the vehicle drivetrain assembly taken as in FIG. 1 but before the electromagnetic pulse welding.

As illustrated in FIGS. 1 and 2, the first aluminum member 12 is a clutch hub or housing defining the plate portion 18 and also having an axially extending thin-walled spline portion 24 which includes thin-walled splines 26 shown in FIG. 1*b*.

As also shown in FIGS. 1 and 2, the second steel member 14 is shown as a sun gear having helical teeth 28 and also can be constructed as a ring gear, torque transmitting hub or a shaft.

Figure 5:
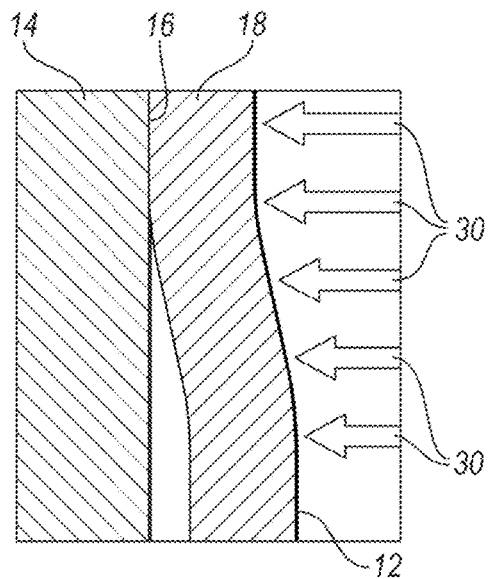
FIG. 5 is a view that illustrates the manner in which the embodiment of FIGS. 1 and 2 has its aluminum member electromagnetically pulse welded in a progressive manner along a radial direction with respect to the central axis of the vehicle drivetrain assembly to form the weld.
Figure 7:
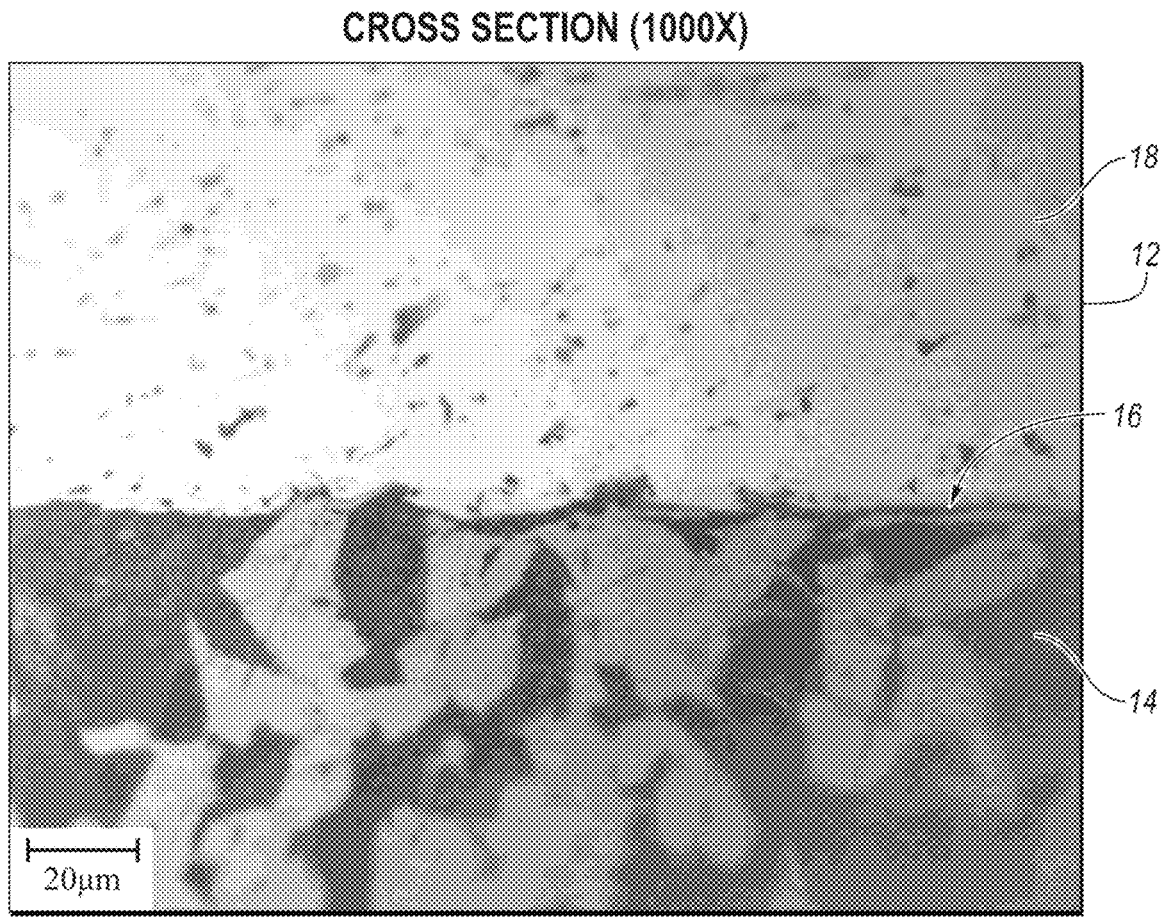
FIG. 7 is a greatly enlarged view that illustrates the atomic bonding of the aluminum and steel members to each other.

As illustrated in FIG. 5, the electromagnetic pulse welding forms the plate portion 18 of the aluminum member 12 progressively in a radial direction with respect to the central axis of the assembly as illustrated by the schematic arrows 30 to form the weld 16 to the steel member 14. The electromagnetic pulse welding provides the weld 16 as illustrated in the greatly magnified (1000.times) view of FIG. 7 at an atomic level so as to secure the aluminum and steel to each other.

Figure 8:
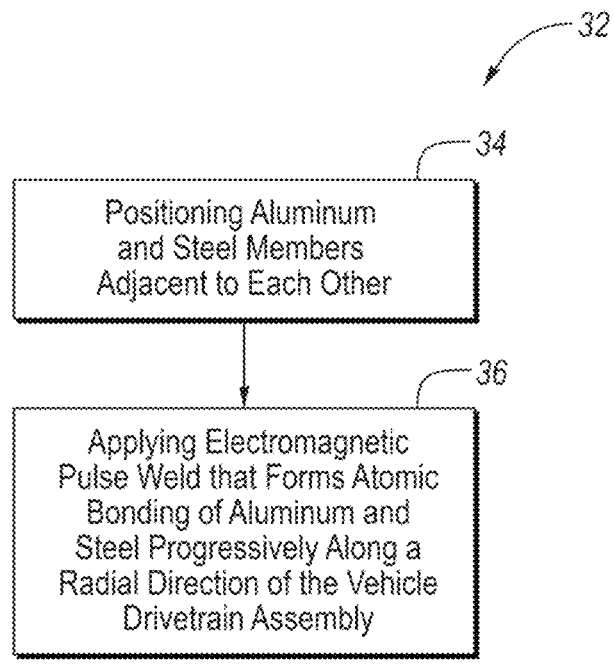
FIG. 8 is a flow chart illustrating the manner in which the one embodiment of the vehicle drivetrain assembly shown in FIGS. 1, 1a, 2, 2a and 5 is processed.

As illustrated in FIG. 8, the flow chart 32 illustrates in step 34 the positioning of the aluminum and steel members adjacent to each other as also shown in FIG. 2 and in step 36 shows applying the electromagnetic pulse weld that forms the atomic bonding of the aluminum and steel.

Figure 3A:
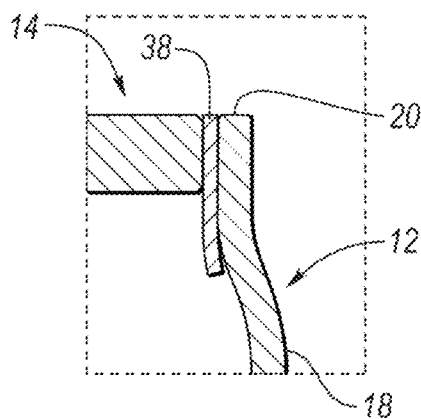
FIG. 3a is an enlarged view of a portion of FIG. 3 similar to FIG. 1a and illustrating the additional aluminum member that is at the formed electromagnetic pulse weld.
Figure 3:
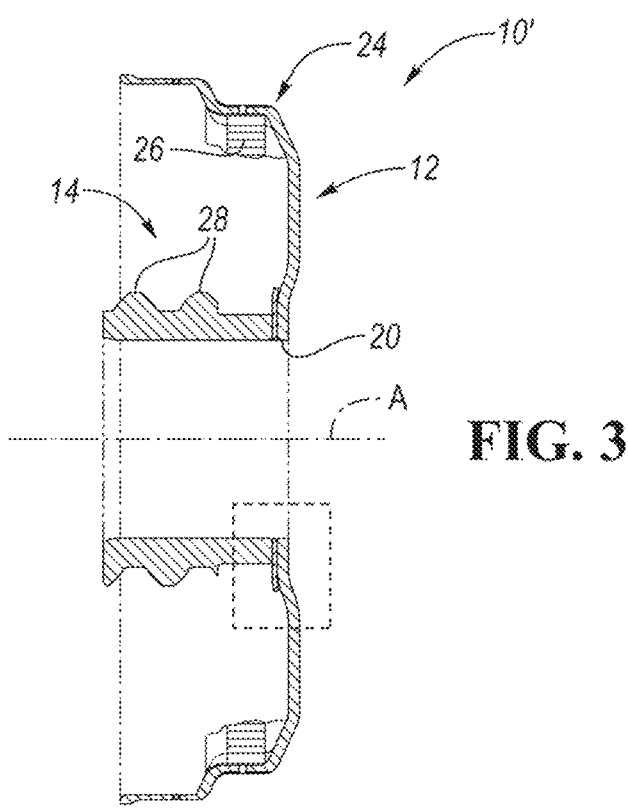
FIG. 3 is a view of another embodiment of the vehicle drivetrain assembly taken in the same sectional manner as FIG. 1 but also having another aluminum member that is of a lower grade than the first aluminum member and that is located at the electromagnetic pulse weld for enhancing the weld strength.
Figure 4A:
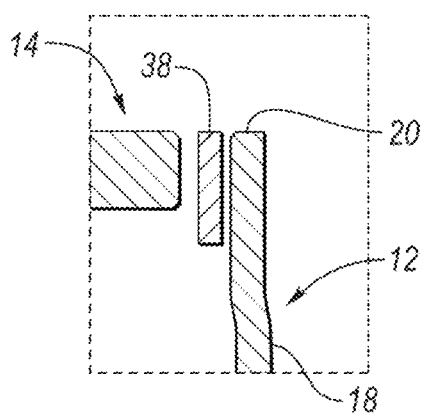
FIG. 4a is an enlarged view of a portion of FIG. 4 showing the vehicle drivetrain assembly components prior to the forming and electromagnetic pulse welding.
Figure 4:
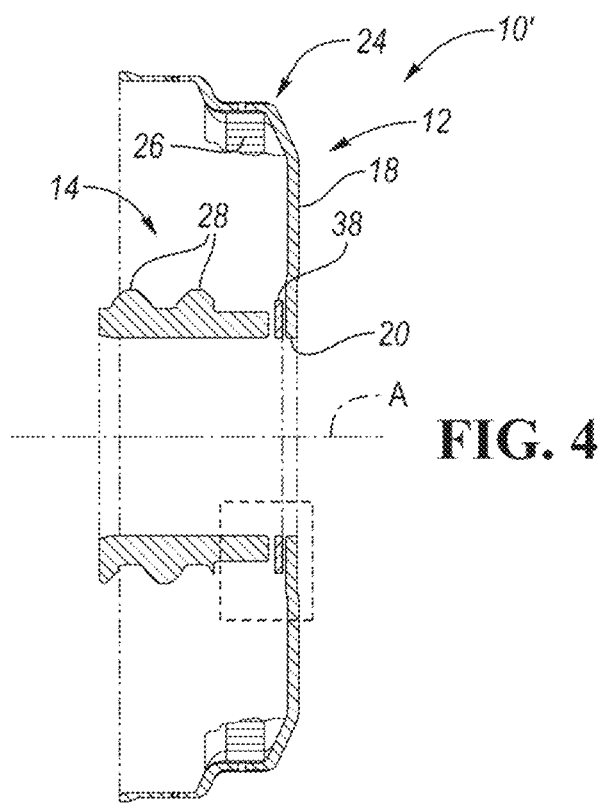

With reference to FIGS. 3, 3*a*, 4 and 4*a*, another embodiment of the vehicle drivetrain assembly is indicated generally by 10' and has the same construction as the previously described embodiment except as will be discussed. As such, like reference numerals are applied to the like components thereof and much of the previous description is applicable such that no repetition thereof is necessary and thus will not be repeated. However, in embodiment 10', another aluminum member 38 is initially positioned as shown in FIG. 4*a* between the connection location 22 of the steel member 14 and the plate portion 18 of the aluminum member 12 in preparation for the electromagnetic pulse welding. This aluminum member 38 is of a lower grade aluminum than the first aluminum member 12 and thus enhances the atomic bonding to the steel member 14. More specifically the aluminum member 38 is of a grade with a four digit member whose first digit is lower than the first digit of the four digit member of the grade of the first aluminum member 12 so as to form easier due to its less strength resulting from less alloying. Further, the aluminum member 38 extends around the opening 20 of the plate portion 18 of aluminum member 12 positioned adjacent the steel member connection location 22 where the electromagnetic pulse welding provides the atomic bonding. Also, the aluminum member 38 has a thickness less than 3 mm., preferably 1.5 mm. which herein means 1.5 mm. with a tolerance of plus or minus 10%, so the relatively thin aluminum has less mass than a thicker aluminum member. Thus, the aluminum member 18 is accelerated faster and has a greater impact for providing the better atomic bonding with the steel as is also provided by its less alloyed lower grade. The thicker first aluminum member 12 also atomically bonds with the lower grade aluminum of the thin aluminum member 38.

Figure 6:
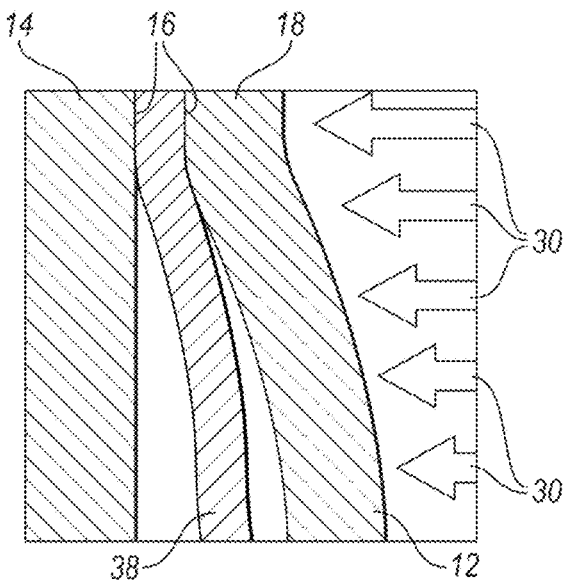
FIG. 6 is a view similar to FIG. 5 that shows the manner in which the two aluminum members of the embodiment of FIGS. 3 and 4 are progressively formed by the electromagnetic pulse welding along a radial direction with respect to the central axis of the vehicle drivetrain assembly to form the weld.

As illustrated in FIG. 6, the electromagnetic pulse welding forms both the plate portion 18 of the aluminum member 12 and the aluminum member 38 progressively in a radial direction with respect to the central axis of the assembly as illustrated by the schematic arrows 30 to form the weld 16 with the steel member 14.

Figure 9:
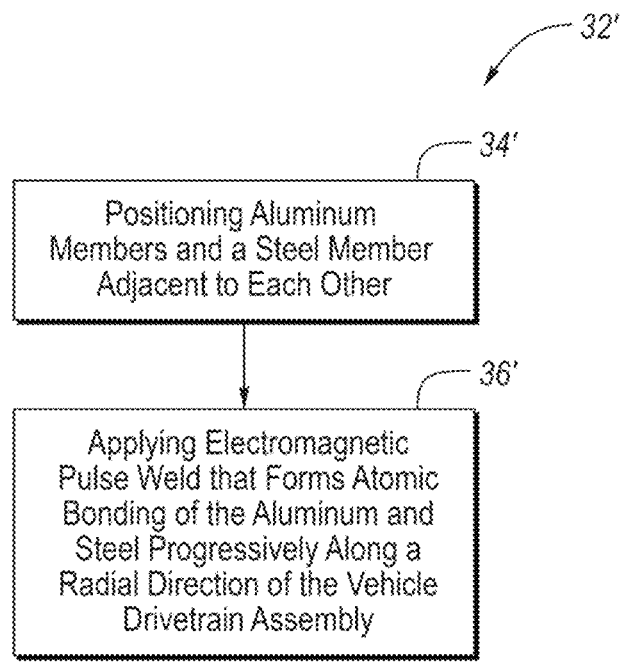
FIG. 9 is another flow chart illustrating the manner in which the other vehicle drivetrain assembly shown in FIGS. 3, 3a, 4, 4a and 6 is processed.

As illustrated in FIG. 9, the flow chart 32' illustrates in step 34' the positioning of the aluminum members 12 and 38 and the and steel member 14 adjacent to each other as also shown in FIG. 3 and in the step 36 shows the next step of applying the electromagnetic pulse weld that forms the atomic bonding of the aluminum and steel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method for making a vehicle drivetrain assembly comprising:

positioning an annular planar plate portion of an aluminum torque transmitting member having a first round opening with a central axis in a spaced relationship adjacent an annular connection location of a steel torque transmitting member with the annular connection location facing axially relative to the central axis and extending around the opening of the aluminum torque transmitting member, wherein the aluminum torque transmitting member is a clutch hub or housing including an annular wall circumferentially-extending around the planar plate portion and having an axially extending spline portion, and further wherein the steel torque transmitting member is a sun gear, a ring gear, a torque transmitting hub, or a shaft, and has a second round opening through which the central axis extends; and progressively applying an electromagnetic pulse weld along a radially outward direction relative to the central axis of the assembly to form and weld the plate portion of the aluminum torque transmitting member to the connection location of the steel torque transmitting member, wherein the radially outward direction extends along a direction extending from a radially inner surface of the steel torque transmitting member toward a radially outer surface of the steel torque transmitting member.

2. A method for making a vehicle drivetrain assembly as in claim 1 wherein an intermediate aluminum member is positioned between the aluminum torque transmitting member and the steel torque transmitting member and is made of aluminum of a lower grade than the aluminum torque transmitting member.

3. A method for making a vehicle drivetrain assembly as in claim 2 wherein the intermediate aluminum member has a thickness less than 3 mm.

4. A method for making a vehicle drivetrain assembly as in claim 3 wherein the intermediate aluminum member has a thickness of 1.5 mm plus or minus 10%.

5. A method for making a vehicle drivetrain assembly as in claim 3 wherein the intermediate aluminum member atomically bonds with the aluminum torque transmitting member and with the steel torque transmitting member.

6. A method for making a vehicle drivetrain assembly as in claim 3 wherein the intermediate aluminum member is composed of aluminum of a four digit grade whose first number is lower than a first number of a four digit grade of aluminum of the aluminum torque transmitting member.

7. A method for making a vehicle drivetrain assembly as in claim 2 wherein the intermediate aluminum member is thinner than the aluminum torque transmitting member and has a thickness of less than 3 mm.

8. A method for making a vehicle drivetrain assembly as in claim 7 wherein the intermediate aluminum member has a thickness of 1.5 mm plus or minus 10%.

\* \* \* \* \*